United States Patent [19]
Wacker et al.

[11] Patent Number: 5,532,922
[45] Date of Patent: Jul. 2, 1996

[54] NON-LINEAR CONTROL SYSTEM FOR A SINGLE INPUT SINGLE OUTPUT PROCESS

[75] Inventors: Paul C. Wacker; Gary A. Smith, both of Plymouth, Minn.

[73] Assignee: Honeywell Inc., Minneapolis, Minn.

[21] Appl. No.: 315,650

[22] Filed: Sep. 30, 1994

[51] Int. Cl.⁶ .................................................. G05B 13/02
[52] U.S. Cl. ........................ 364/15.2; 364/183; 364/510
[58] Field of Search .................................. 364/152, 160, 364/161, 162, 163, 157, 183, 167.01, 510, 571.07; 318/561, 609, 610

[56] References Cited

U.S. PATENT DOCUMENTS

| | | | |
|---|---|---|---|
| 3,749,891 | 7/1973 | Burrows et al. | 318/636 X |
| 4,496,829 | 1/1985 | Black et al. | 219/497 |
| 4,501,125 | 2/1985 | Han | 364/163 X |
| 4,796,651 | 1/1989 | Ginn et al. | 364/510 X |
| 4,797,834 | 1/1989 | Honganen et al. | 364/510 |
| 4,852,053 | 7/1989 | Turrie | 364/157 X |
| 5,021,941 | 6/1991 | Ford et al. | 364/183 X |
| 5,029,569 | 7/1991 | Cullen et al. | 364/510 X |
| 5,142,612 | 8/1992 | Skeirik | 395/11 |
| 5,159,660 | 10/1992 | Lu et al. | 395/22 |
| 5,197,114 | 3/1993 | Skeirik | 395/22 |

*Primary Examiner*—Joseph Ruggiero
*Attorney, Agent, or Firm*—Edward L. Schwarz

[57] ABSTRACT

A control system and method for providing a nonlinear response for a single input-single output system. A system output is measured and compared against a predetermined set point. An error signal from this measurement is used to identify an entry in a lookup table. The entry is a control signal used to vary the input to the system so as to reach a desired output. The lookup table entries are configured so that as the output reaches the desired set point, smaller and smaller incremental steps are taken in varying the input.

12 Claims, 4 Drawing Sheets

| 37-44 mV | 30-36 mV | 25-29 mV | 21-25 mV | 17-20 mV | 13-16 mV | 9-12 mV | 6-8 mV | 3-5 mV | 1-2 mV | 0 mV |
|---|---|---|---|---|---|---|---|---|---|---|
| 15 | 8 | 5 | 3 | 2 | 2 | 1 | 1 | 1 | 1 | 0 |

FIGURE 2

NON-LINEAR CONTROL SYSTEM FOR A SINGLE INPUT SINGLE OUTPUT PROCESS

FIELD OF THE INVENTION

The present invention relates to control systems and more specifically with providing a non-linear control response for a single input-single output (SISO) process.

BACKGROUND OF THE INVENTION

It is desirable to automate many industrial or other processes for a number of reasons. For example, the automatic control of the piloting of an airplane is desirable to avoid human fatigue and error over long flights. In many industrial processes such as the operation of a factory, automatic control is preferable to human control since the number of variables and speed of reaction makes human control at times impractical. In other processes, such as the operation of a household furnace, the use of an automatic control is the only practical solution since direct human control would be uneconomic.

In all these control applications, the automatic controller must react to changes in process output operating parameters which in turn will require modification of a process input parameter. Take for example, the household thermostat, the decrease in temperature of the house below a preset temperature causes the thermostat to activate the furnace control. The activation of the furnace eventually causes the temperature in the house to rise beyond the preset temperature, causing the thermostat to deactivate the furnace.

In more complicated systems, a more complex response of the controller may be required. For example, where the initial error in the system is great or has been present for a long time, the response from the controller may be more drastic than where the initial error is slight or recent in time. Similarly, where the error is changing rapidly with time, the response of the controller may be more drastic than if the error is changing slowly. Controllers which are able to react in this way are referred to as proportional-integral-derivative, or PID controllers, and such controllers have dominated industrial controller applications to date. These controllers work by examining the instantaneous error between the process output value and the set point. The proportional term causes a larger control action to be taken for a larger error. The integral term causes a larger control action to be taken if the error has persisted for some time. The derivative term supplements the control action based on the rate of change of the error.

The value of PID terms depend on characteristics of the process and must be tuned accordingly to yield satisfactory control. Properly tuned PID controllers provide adequate control for a large portion of industrial applications. However, there are many processes with time-variant or nonlinear characteristics which are difficult to control with fixed parameter PID controls. It is well known that conventional PID controllers cannot always control to an "ideal" control response. This limitation is inherent in the linear response of the PID controllers to error stimulus. When the characteristics of a SISO process operation are not linear in nature, a PID controller may not provide the desired accuracy. Varying a process control input does not necessarily mean a process output will vary in a linear fashion. A nonlinear control response to an error stimulus can significantly improve control performance with respect to response time, over shoot and control stability.

Therefore, it is an object of the present invention to provide a non-linear control response system for a single input-single output process.

SUMMARY OF THE INVENTION

The invention described herein is a single input-single output (SISO) control system which provides non-linear control of an output through manipulation of an input. Included in the system is a sensing means which detects the magnitude of the system output. An error signal generator outputs an error signal which has a magnitude which is proportional to the difference between the magnitude of the output and a predetermined set point. The error signal may also add a term which is dependent on the rate of change of the process output. The sign of the error signal is indicative of the error direction. A lookup table contains a series of entries, each of which corresponds to a particular magnitude range for the error signal. The entries of the lookup table are control signals which are input to the control system to manipulate a control mechanism which varies the magnitude of the input to the process.

In operation, the sensor measures the magnitude of the output of the process. This magnitude is compared to a predetermined set point and an error signal is generated which is proportional to the difference between the output magnitude and a predetermined set point. This error signal is also either positive or negative depending on the value of the system output in relation to the predetermined set point. The magnitude of the error signal is compared against the series of error signal ranges in the lookup table. Once the particular range is located, the control signal which corresponds to the particular error signal range is then used to vary the magnitude of the input to the process. The lookup table is set up so that the smaller the error signal, the smaller the control signal to change the input. At predetermined intervals a new error signal is generated and a control signal is selected. As the measured output approaches the set point, the step changes in varying the input become smaller and smaller until the ideal operating condition is reached.

BRIEF DESCRIPTION OF THE DRAWINGS

FIG. 2 is an example of a typical lookup table.

DESCRIPTION OF THE PREFERRED EMBODIMENT

Figure 1:
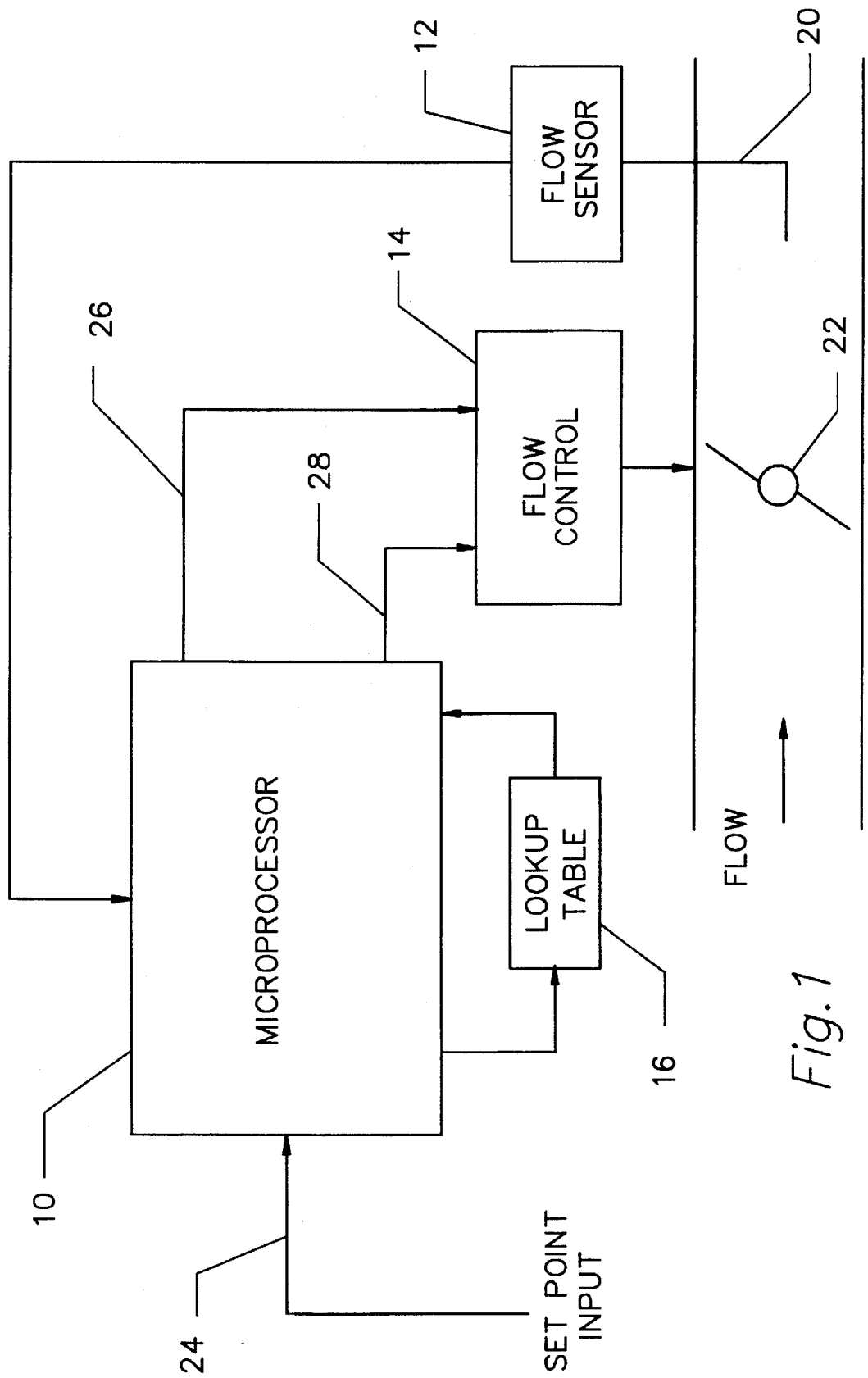
FIG. 1 is a block diagram of the control system.

Shown in FIG. 1 is a block diagram for a variable air volume (VAV) control system. Although an air flow control system is the preferred embodiment, one skilled in the art would see that the control system described herein could be applied to many other home and industrial applications, one example being temperature control. The VAV system shown is of the single input-single output (SISO) type. The input to the VAV process is the flow control and the output is the sensed flow rate. Changing the input of the system has a direct and singular effect on the output.

Included in the control system is microprocessor 10. Incorporated into the microprocessor or stored in a separate memory is lookup table 16. In electrical connection with the microprocessor 10 is the flow sensor 12. The mechanical portion 20 of the flow sensor extends out into the air flow.

The flow sensor 12 provides a measurement of the air flow rate encoded in a sensor signal which is then transmitted back to the microprocessor.

Also in electrical contact with microprocessor 10 is flow control 14. Incorporated into flow control 14 is a bi-directional electric motor which either opens or closes the valve device 22 in the air flow so as to either decrease or increase the flow rate. An operation signal is sent out on lines 26 and 28 from the microprocessor in order to either increase or decrease the flow rate. Depending on the operating signal transmitted by the microprocessor, flow control 14 either opens or closes valve device 22. Also in connection with the microprocessor is set point input 24. This provides a user selected set point for the flow rate.

Lookup table 16 contains a series of control signal values which are used to manipulate the flow control. In this embodiment, the magnitude of the individual entries are proportional to the drive times for the valve motor (not shown). The larger the magnitude of the control signal, the longer the valve motor spins the valve mechanism 22 to either increase or decrease the flow. The microprocessor 10 chooses which control signal value from the look up table 16 will be sent "used to define operating signal" to flow control 14.

The choice of control signals "used to define the operating signal sent" to the flow control is made by "an error signal generating means forming a part of microprocessor 10, and which compares"; the magnitude of the flow rate as measured by the flow sensor 12, with the set point input over line 24. In the microprocessor, this comparison is performed and an error signal is generated which has a magnitude which is the difference between the set point and the measured flow rate. The sign or polarity of the error signal is indicative of whether the flow rate is too slow or too fast. This comparison of two incoming signals and the generation of an error signal is done by methods and electronic components which are well known in the art. For increased control stability, the error signal may also have a term which is dependent on the rate of change of the process. This error signal derivative term is not necessary in the VAV embodiment. "The control signal value in each look up table 16 entry corresponds to a particular magnitude range for the absolute value of the error signal. Each look up table 16 entry includes at least one error signal value which defines a particular magnitude range of the error signal. Once the error" signal is generated the microprocessor then scans the lookup table for the appropriate value to encode the control signal to transmit to the flow control 14. An example of a lookup table is shown in FIG. 2. Each entry in the "box shown in FIG. 2 as comprising a look up table,"; is a period of time in which the flow valve is to be rotated. In the embodiment described herein, the control loop time is 15 seconds and the time periods run from 15 seconds down to 0 seconds. The control loop can be different for different processes to match process response requirements. Above each entry in the look up table is the corresponding error signal range. The larger the error signal the larger the flow control drive time. "Each of these error signal ranges is recorded in the individual look up table entry wherein is recorded the corresponding control signal value." The significance of this correlation will be described in more detail below. The range for the error signals in this embodiment is from 37–44 mV to 1–2 mV.

From the polarity of the error signal, the microprocessor will determine whether to open or close the flow valve. Once this determination is made, the operating signal is sent over one of two lines. The choice of either line affects the direction of the flow valve movement. For example, if the error signal indicates that the measured flow rate is less than the set point, the operating signal will be sent out over line 26 to flow control 14 to open the valve. The actual drive time is determined by the value chosen from the lookup table. Conversely, if the flow rate is above the set point, the operating signal will be sent by the microprocessor over line 28 to valve control 14 to close the valve. The direction of the flow operating is dependent on the line the control signal is sent out over.

An important aspect of the present invention is the nonlinear nature of the control system's responses to the error signals. The motivation in designing the present system is to avoid overshooting the set point or oscillations around the set point which is a problem in many linear systems such as PID. The key in creating a nonlinear system is the order and magnitude of the control signal entries in the lookup table.

As was described above, the entries for the lookup table are matched with a particular range of error signals. This alignment is such that the smaller the absolute value of the error signal, the smaller the control signal for driving the flow control. This type of correlation allows the flow rate to approach the desired set point in discrete steps while significantly lowering the chance for overshoot. When the absolute value of the error signal is large, the control signal is large and the valve device 22 is moved in large increments to significantly change the flow of rate. As the error gets smaller and smaller the valve movements get smaller and smaller so the flow rate slowly approaches the set point.

Figure 3:
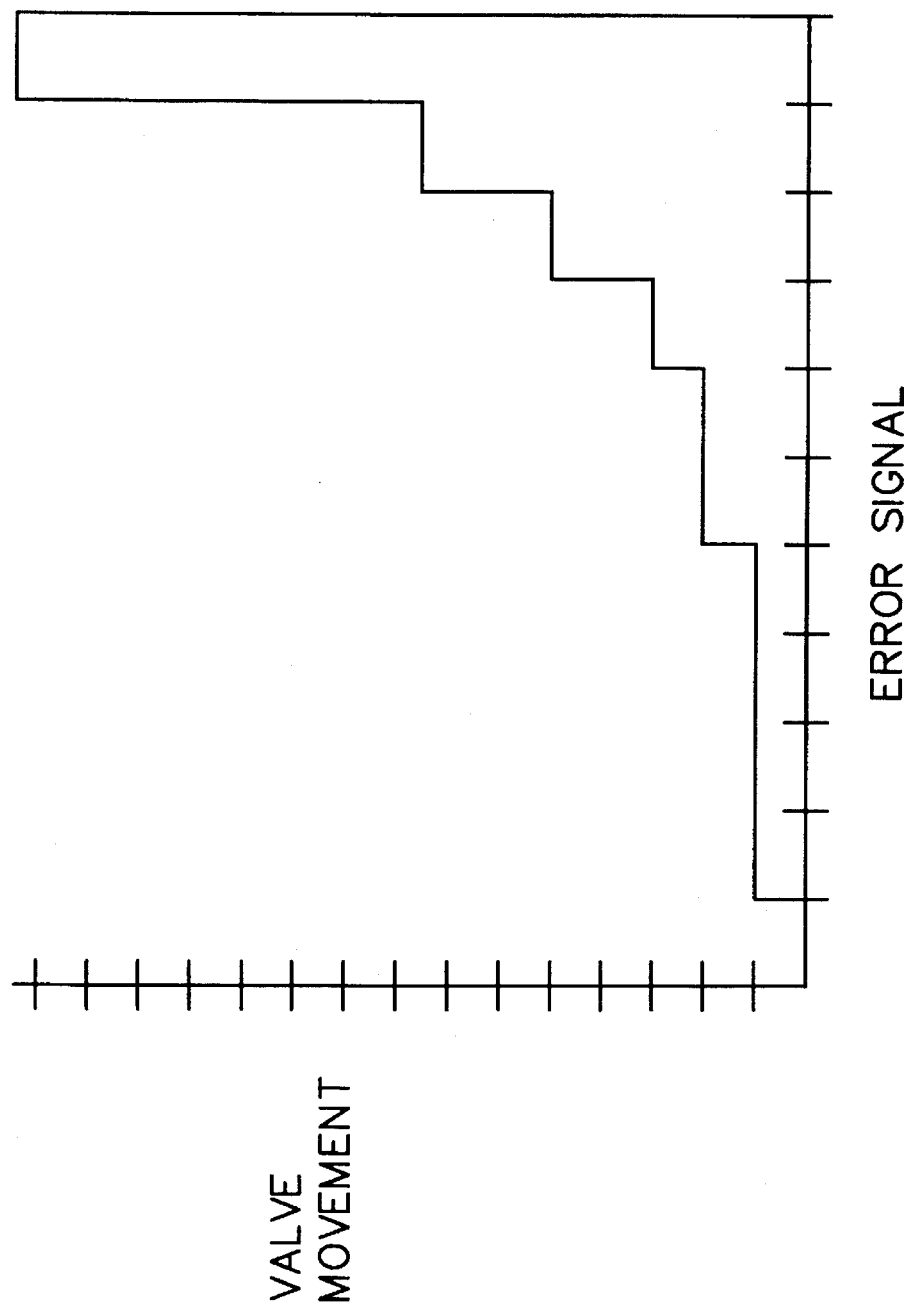
FIG. 3 is a graph of the actuator movement versus the magnitude of the error signal.

In FIG. 3 is a graph which depicts total valve movement (rotation time) versus error signal magnitude. As is seen, when the error signal is larger, the valve movement is also large. As the error signal gets smaller, the amount of valve movement gets smaller in relation. This type of correlation between the error signal and valve movement provides a nonlinear response to process output variations.

Figure 4:
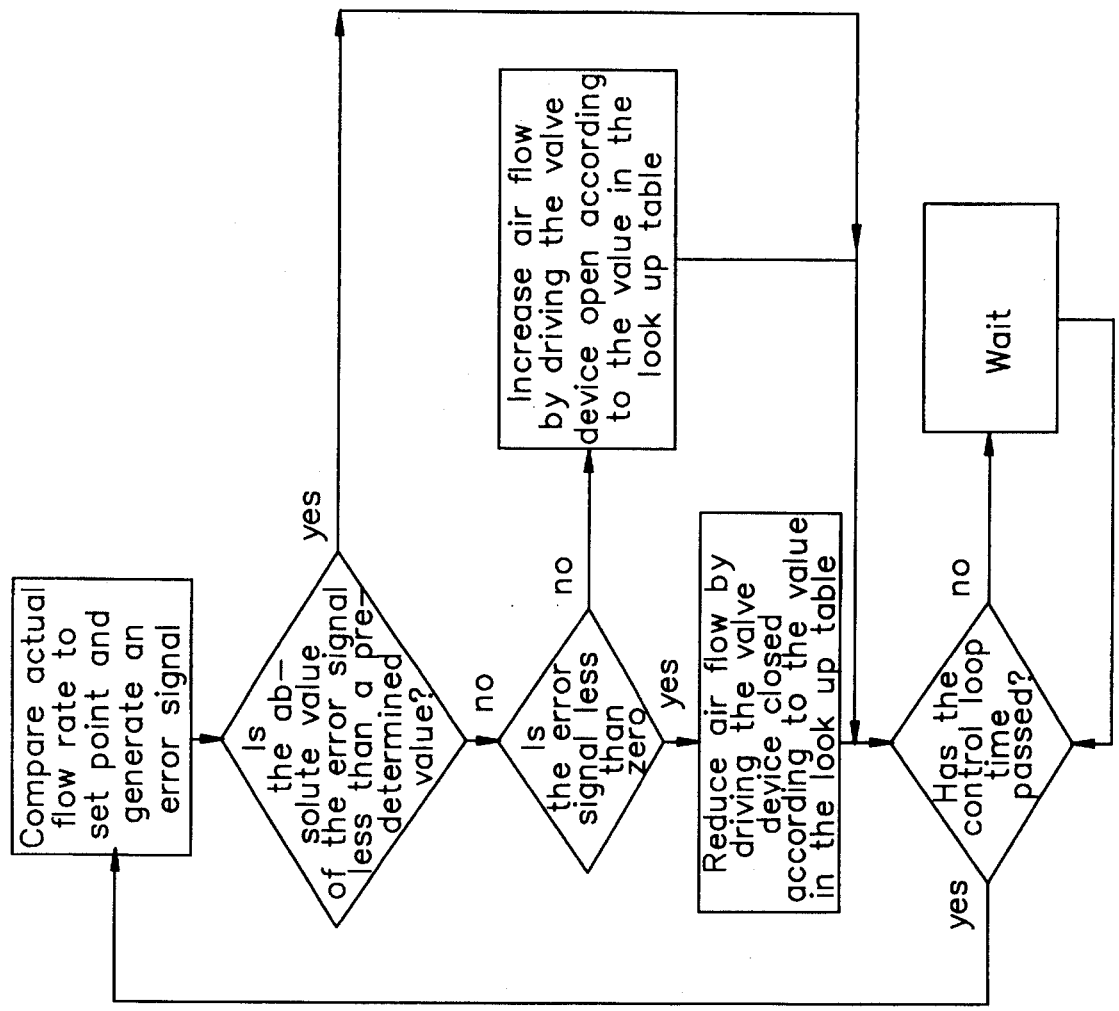
FIG. 4 is a flow chart of the control system operation.

The operation of the control system can be better understood by study of the flow chart in FIG. 4. The first step in the process is to compare the measured flow rate to a preprogrammed set point. From this an error signal is generated which has a magnitude which is proportional to the difference between a set point and the measured flow rate. The absolute value of the error signal is compared by the microprocessor to a range of values in the lookup table. If the error signal is so small that it does not fit in any of the ranges of the lookup table, the flow rate is sufficiently close to the set point and the control response is no change in process input. If the error signal fits within one of the ranges in the lookup tables, the control signal for that range is retrieved. Next, a determination is made of whether the control signal is negative or positive, which is indicative of the direction of the error. For example, a negative signal indicates the flow is too slow and a positive signal indicates the flow is too fast. Once the proper control signal and direction for correction is determined, the flow rate is then adjusted by driving the actuator accordingly.

In providing further control for the process it may be desirable to control the valve device 22 with position commands instead of the relative commands of opening and closing. First, the valve motor speed must be entered as a parameter. In this embodiment, the drive open and close commands are not sent directly to the flow control actuator (14) but instead are used to calculate the control position which the actuator uses to drive to the commanded position. The position is updated as follows: new commanded position=old position+ (sign of error)*(drive time from table)*(actuator speed). This embodiment allows for usage of common voltage or current input actuators with the previous embodiment.

The foregoing is a description of a novel and nonobvious, nonlinear, control system for a single input-single output control process. The applicant does not intend to limit the invention through the foregoing description but instead define the invention through the claims appended hereto.

We claim:

1. A control system for a single input-single output process, said process including i) a controlled variable having an output magnitude and ii) an input receiving an operating signal in which is encoded a value responsive to which a process parameter changes, said parameter change causing the controlled variable's output magnitude to change in a predictable manner dependent on the value encoded in the operating signal, said control system comprising:

sensing means which detects the controlled variable's output magnitude at predetermined intervals and provides a sensor signal encoding the output magnitude;

error signal generating means receiving the sensor signal, for generating an error signal with a magnitude proportional to the difference between the sensor signal output magnitude and a predetermined set point, and a polarity indicative of error direction;

a look up table receiving the error signal, said look up table having a plurality of recorded entries, wherein each of the entries comprises a preselected control value magnitude and an error value specifying a range of error signal magnitudes, wherein the look up table provides a control signal encoding the control value magnitude recorded in the entry in which is also recorded the error value specifying a range of error signal magnitudes within which falls the error signal magnitude in the current error signal from the error signal generating means; and control means receiving the error signal and the control signal from the look up table and responsive thereto, for providing the operating signal in which is encoded a value proportional to the magnitude of the look up table output and having a polarity dependent on the polarity of the error signal.

2. The control system of claim 1 wherein the process includes an actuator operating at a predetermined rate responsive to a predetermined first state of the operating signal and inoperative otherwise, wherein the look up table includes in its entries a control value indicative of a time interval, and wherein the control means comprises means for, during a predetermined interval, providing an operating signal having a first state for an interval dependent on the control value magnitude encoded in the control signal from the look up table and a second state during the remainder of the interval.

3. The control system of claim 2 wherein the process includes a flow control valve including an actuator which alters air flow magnitude in response to the value encoded in the operating signal and wherein the sensing means comprises an air flow sensor providing a signal indicative of the air flow magnitude.

4. The control system of claim 3 wherein the actuator moves bi-directionally to increase or decrease air flow magnitude and moves in a particular direction depending on whether the polarity of the error signal is negative or positive.

5. The control system of claim 1 wherein the look up table is configured such that the smaller the magnitude of the error signal transmitted to the look up table, the smaller is the control value magnitude encoded in the control signal provided by the look up table to the control means.

6. The control system of claim 1 wherein the error signal contains a derivative error term.

7. The control system of claim 1 wherein the process includes an element for altering the process parameter which operates at a known rate and wherein the look up table entries include control values corresponding to time periods.

8. A method of providing control in a single input-single output process, said process including i) a controlled variable having an output magnitude and ii) an input receiving an operating signal in which is encoded a numerical value responsive to which a process parameter changes, said parameter change causing the controlled variable's output magnitude to change in a predictable manner dependent on the magnitude of the value encoded in the operating signal, said method comprising the steps of:

providing a sensor signal encoding the controlled variable's output magnitude at predetermined intervals;

generating an error signal encoding a value having a magnitude equalling the difference between a predetermined set point and the value encoded in the sensor signal, and a polarity which is indicative of error direction;

recording in a memory a look up table having a plurality of recorded entries, each of the entries comprising a preselected control value magnitude and an associated error value specifying a range of error signal magnitudes;

providing a control signal encoding the control value magnitude recorded in the look up table entry in which is also recorded the error value specifying a range of error signal magnitudes within which is the error signal magnitude in the current error signal from the error signal generating means;

at each predetermined interval, providing the operating signal to the process input, said operating signal having encoded therein a value dependent on the control value magnitude encoded in the current control signal and having a polarity dependent on the error signal polarity; and when the error signal is smaller than a predetermined amount, providing an operating signal encoding a value at least temporarily terminating process parameter changes.

9. The method of providing control of claim 8 wherein the process is of the type whose process parameter changes while the operating signal has a first level and does not change while the operating signal has a second level; wherein the recording step comprises the step of recording a plurality of control value magnitudes representative of time interval lengths; and wherein the step of providing the operating signal further comprises the step of supplying an operating signal having a first level for a duration equal to the control value magnitude encoded in the control signal, and a second level otherwise.

10. The method of providing control of claim 8 wherein the error signal is negative or positive depending on whether the magnitude of the value encoded in the sensor signal is greater or less than the predetermined set point.

11. The method of providing control of claim 8 wherein look up table recording step includes the step of making the magnitude of each of the control values in the look up table smaller as the error magnitudes specified by the associated error values of the respective entries becomes smaller.

12. The method of providing control of claim 8 wherein the process parameter changes at a known rate, wherein the look up table recording step further comprises the step of basing the magnitude of at least one of the control values in the look up table on the known rate of change of the process parameter.

* * * * *